(12) United States Patent
Norman et al.

(10) Patent No.: US 9,643,671 B2
(45) Date of Patent: May 9, 2017

(54) KIT FOR BUILDING A VEHICLE

(71) Applicants: The Norman Trust, London (GB); Gordon Murray Design Limited, Surrey (GB)

(72) Inventors: Torquil Norman, London (GB); Ian Gordon Murray, Surrey (GB); James Dowle, Goring (GB)

(73) Assignee: THE NORMAN TRUST, London (GB)

( * ) Notice: Subject to any disclaimer, the term of this patent is extended or adjusted under 35 U.S.C. 154(b) by 0 days.

(21) Appl. No.: 14/779,714

(22) PCT Filed: Mar. 25, 2014

(86) PCT No.: PCT/EP2014/055919
§ 371 (c)(1),
(2) Date: Sep. 24, 2015

(87) PCT Pub. No.: WO2014/154665
PCT Pub. Date: Oct. 2, 2014

(65) Prior Publication Data
US 2016/0046336 A1    Feb. 18, 2016

(30) Foreign Application Priority Data

Mar. 26, 2013 (GB) .................................. 1305495.2

(51) Int. Cl.
| | | |
|---|---|---|
| *B62D 33/00* | (2006.01) | |
| *B62D 63/02* | (2006.01) | |
| *B65D 85/68* | (2006.01) | |

(52) U.S. Cl.
CPC .......... *B62D 63/025* (2013.01); *B65D 85/68* (2013.01); *B65D 2585/6867* (2013.01)

(58) Field of Classification Search
CPC .................. B62D 36/025; B65D 85/68; B65D 2585/6867
See application file for complete search history.

(56) References Cited

U.S. PATENT DOCUMENTS 3,811,218 A * 5/1974 Salmon ................ A63H 17/262
446/94
7,059,661 B2 * 6/2006 Mataja ..................... B62K 9/00
296/177

(Continued)

FOREIGN PATENT DOCUMENTS

EP    0745542 A1    12/1996
EP    1607313 A2    12/2005

(Continued)

OTHER PUBLICATIONS

International Search Report dated Jul. 15, 2014 for corresponding International Application No. PCT/EP2014/055919, filed Mar. 25, 2014.

(Continued)

*Primary Examiner* — Lori L Lyjak
(74) *Attorney, Agent, or Firm* — Westman, Champlin & Koehler, P.A.; Z. Peter Sawicki; Amanda M. Prose (57) ABSTRACT

A kit for constructing a commercial vehicle supplied ex-works as a flat-pack package using the vehicle chassis as a pallet. The kit includes components comprising: a chassis, an engine attachable to the chassis, located within and supported by the chassis, and a plurality of upright chassis members attachable to the chassis thereby to define at least a cabin, placed flat over the chassis. The component making up the kit can be restrained in place, such as by wrapping or tying with suitable film, bands or cords. Body panels attachable to the chassis uprights can be supplied, placed flat over the chassis. Brake line, a wiring loom and major drivetrain items such as the engine, differential and propshaft may be (Continued)

pre-attached to the chassis in their final locations before shipping the kit. With suitable spacers, several such kits could be packed for transport in a single vehicle or container.

16 Claims, 7 Drawing Sheets

(56) References Cited

U.S. PATENT DOCUMENTS

| | | | |
|---|---|---|---|
| 2004/0007440 A1* | 1/2004 | Doan | B62D 65/18 198/468.8 |
| 2004/0194313 A1 | 10/2004 | Chernoff et al. | |
| 2005/0064786 A1* | 3/2005 | Olney | A63H 17/002 446/470 |
| 2012/0025027 A1* | 2/2012 | Yandle | B64D 1/14 244/137.1 |
| 2012/0205175 A1 | 8/2012 | Masserang et al. | |
| 2015/0129335 A1* | 5/2015 | Niedzwiecki | B62D 63/025 180/65.245 |

FOREIGN PATENT DOCUMENTS

| | | | |
|---|---|---|---|
| GB | 2030934 A | 4/1980 |
| GB | 2067480 A | 7/1981 |
| JP | S60154959 A | 8/1985 |
| WO | 9741005 A1 | 11/1997 |

OTHER PUBLICATIONS

Search Report dated Sep. 16, 2013 for corresponding GB Patent Application No. 1305495.2, filed Mar. 26, 2013.

* cited by examiner

KIT FOR BUILDING A VEHICLE

CROSS-REFERENCE TO RELATED APPLICATIONS

This Application is a Section 371 National Stage Application of International Application No. PCT/EP2014/055919, filed Mar. 25, 2014, the content of which is incorporated herein by reference in its entirety, and published as WO 2014/154665 A1 on Oct. 2, 2014, in English.

FIELD OF THE INVENTION

The present invention relates to a vehicle.

BACKGROUND ART

Vehicles are, by and large, manufactured in large dedicated premises which take delivery of most of the various components and assemble them using a production line so as to produce the finished vehicle. Some components may be manufactured at the same location, especially components that are bespoke to that vehicle (or a small number of vehicles) such as the floorpan, chassis and body panels.

The finished vehicle must then be transported to the consumer who will be typically some distance away, possibly in a different continent. A journey of thousands or tens of thousands of kilometers is by no means unusual, and large container ships may be employed in order to transport the assembled vehicles. Typically, one or perhaps two passenger vehicles can fit into a single 20-foot shipping container, or two to three in a 40-foot container. Where the consumer is located on the same continent, land transportation may be employed including car transporters travelling by either road, or rail, or a combination of both.

Some passenger vehicles are supplied in kit form, usually recreational vehicles. The best-known such vehicle is the Caterham Seven; this was originally offered in kit form for taxation reasons but has become well-known as a kit suitable for home assembly by enthusiasts. The Seven is supplied as a complete chassis and bodyshell to which the wiring loom and brake lines have been attached, in combination with an engine, differential, wheels, exhaust and body trim which are all supplied loose, and a number of separate boxes containing the other parts necessary to build the car. The kit is delivered in a 7.5-tonne truck, one kit per journey, with the chassis/bodyshell in the loadspace of the truck surrounded by the other elements.

Large commercial vehicles such as trucks are usually delivered individually by driving them on the road under their own power, or by carrying them on rail cars. Delivery by road would be unacceptable in the case of passenger vehicles as the car would then be considered second-hand by the customer. Smaller commercial vehicles such as vans are typically delivered in the same way as passenger vehicles.

SUMMARY OF THE INVENTION

The above-described system of distributing vehicles is inefficient. The space required to accommodate the finished vehicles on road, rail or sea transporters is excessive, but necessary in order to avoid contact and resulting damage. Delivery of commercial vehicles is particularly inefficient as high labour costs are involved for delivery by road, and each vehicle occupies a large physical volume if transported by rail or other transporter. As the cost of delivery is ultimately charged to the consumer, this increases the effective price of the vehicle and means that a new commercial vehicle is beyond the means of some consumers. Such consumers will be forced to use less efficient second-hand vehicles which will have a lower capital cost but may have higher running costs in terms of fuel and/or maintenance and will certainly have a shorter life span.

The problem is particularly acute in developing nations where the infrastructure may be less fully developed, thereby increasing the distribution cost for consumers whose purchasing power is less.

The present invention therefore provides a kit for building a commercial vehicle, comprising a chassis, an engine attachable to the chassis, and a plurality of upright chassis members attachable to the chassis thereby to define at least a cabin, the upright chassis members being placed flat over a part of the chassis. It is preferred that the elements making up the kit are restrained in place, such as by wrapping or tying with suitable film, bands or cords. Thus, upright chassis members that can define a cabin when arranged in a first orientation can be placed flat over and supported by a part of the chassis in an orientation differing from the first orientation, in order to allow a more efficient use of space while transporting the vehicle in kit form.

Body panels attachable to the chassis uprights can be supplied, placed flat over the chassis. These can be separate from the chassis uprights, or pre-attached to or integral with the chassis uprights, according to the demands of the kit in question. The chassis may have such items as brake lines and/or a wiring loom attached thereto, to aid in self-assembly of the kit by the final purchaser. Likewise, major drivetrain items such as the engine and/or transmission, differential and driveshaft(s) or propshaft may be attached to the chassis in their final locations. The engine may be attached to the chassis in its final location, or may be located within and supported by the chassis, or may be supplied along with the kit, for example in separate packaging.

The chassis preferably includes a load space defined by a floor area and side walls that at least partially surround the floor area. The side walls may be of a nominal height and the kit may include further parts to extend the height of the side walls. Further components of the kit are preferably placed within the load space, including the body panels.

Often, the load space of a commercial vehicle is compromised by the need to accommodate the rear suspension. Thus, the load space of the chassis may be made up of relatively wider portion ahead of the rear suspension and a relatively narrower portion to the rear thereof. So that the body panels can be accommodated therein whilst retaining an adequate size of cabin in the final vehicle, the cabin preferably has a sloping front face. This will mean that the side panel of the cabin has an upper or rear section of a relatively greater height and a lower or front section of a relatively lesser height and can thus be accommodated substantially horizontally in the load space with the larger section in the relatively wider portion and the smaller section projecting into the relatively narrower portion.

In this way, the complete kit can be prepared at a suitable factory and shipped as a "flat-pack" item. Very little packaging will be needed as the chassis itself can act as a pallet for the remaining items, providing the necessary rigid support to allow handling of the kit. The resulting item will have a footprint similar to that of the final vehicle, but a height which may be one third or one quarter. Together with suitable spacers, several such kits could be packed for transport in a single vehicle or container.

Thus, the essential concept of the present invention is that of a kit for constructing a commercial vehicle supplied ex-works as a flat-pack package using the vehicle chassis as a pallet.

BRIEF DESCRIPTION OF THE DRAWINGS

An embodiment of the present invention will now be described by way of example, with reference to the accompanying figures in which.

DETAILED DESCRIPTION OF THE EMBODIMENTS

In the present application, all references to direction such as left, right, forward, rear, lateral, longitudinal or the like are intended to refer to a direction relative to the orientation of the final vehicle, and should be read as such. Thus, for example, "rearwards" means towards the part of the chassis which will be located at the back of the vehicle when assembly is complete.

Figure 1:
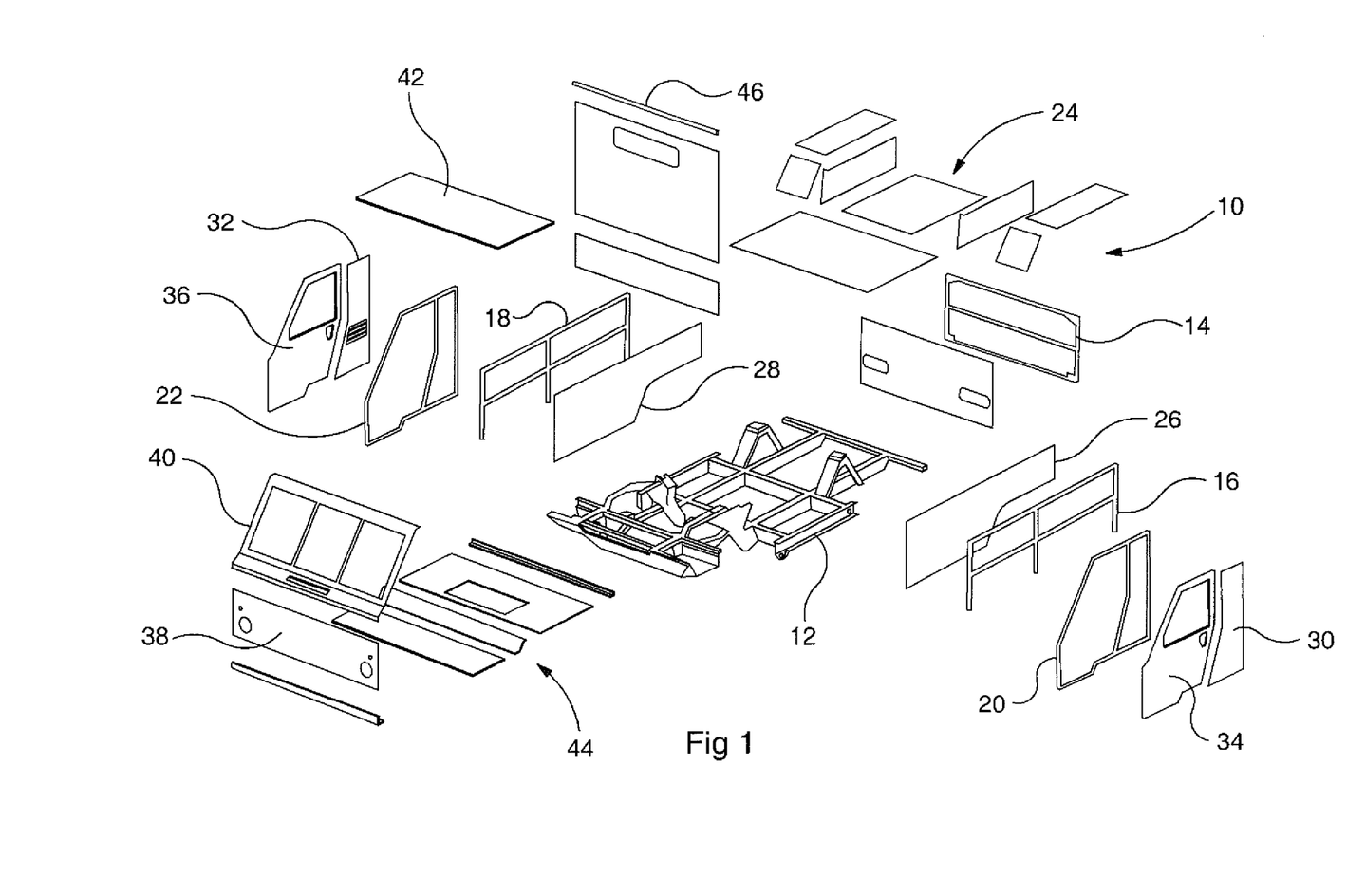
FIG. 1 shows the major parts of the kit in exploded form.

Referring to FIG. 1, an exploded view of the major structural parts of the kit 10 is shown. A conventional ladder chassis 12 has the usual attachment points for the engine, transmission, suspension and like components. A number of chassis uprights are provided in order to define the general chassis outline, and are attachable to the chassis 12. Thus, a rear chassis upright 14 which defines the rearmost upright face of the loadspace can attach to the rearmost cross-member of the chassis 12, and two rear side chassis uprights 16, 18 attach to the side of the chassis 12 in order to define the lateral faces of the loadspace. Two front chassis uprights 20, 22 attach to the lateral sides of the chassis 12 in order to define the lateral extent of a cabin, located towards the front of the vehicle.

Trim panels are also provided, and are attachable to the chassis or to the chassis uprights in order to complete the bodywork of the vehicle. These include interior panelling sections 24, 26, 28 for the loadspace, side panels 30, 32 and doors 34, 36 for the cabin sides, and a front panel 38, windscreen 40, roof 42 and floor 44 for the cabin.

The windscreen 40 is sloped, and the front side uprights 20, 22 and door panels 34, 36 have a correspondingly inclined front edge, meaning that their longitudinal dimension is greater at their bottom edge than at their top edge. This assists with packaging of the kit, as will be described later.

Figure 2:
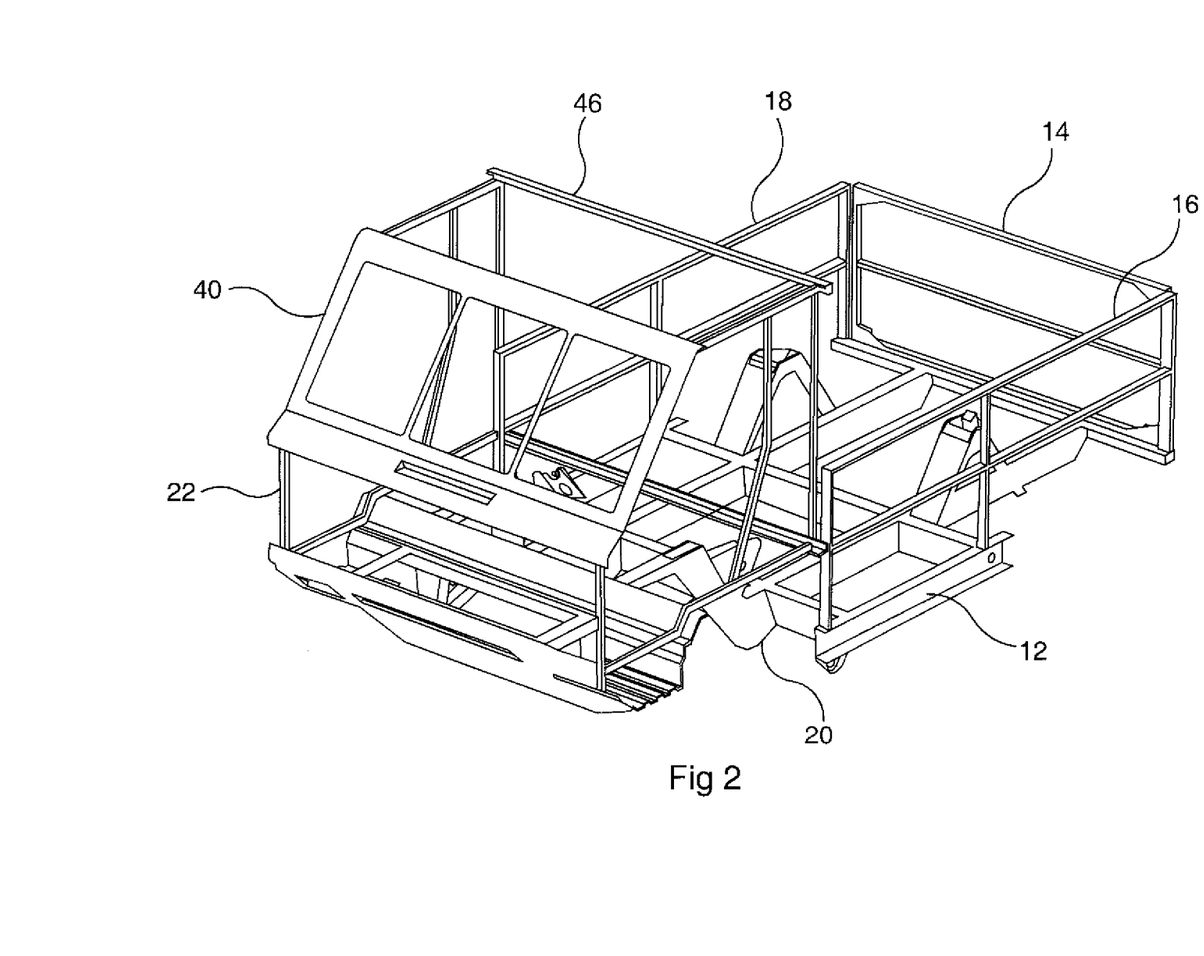
FIG. 2 shows the complete chassis structure of the vehicle including the chassis uprights in place.
Figure 3:
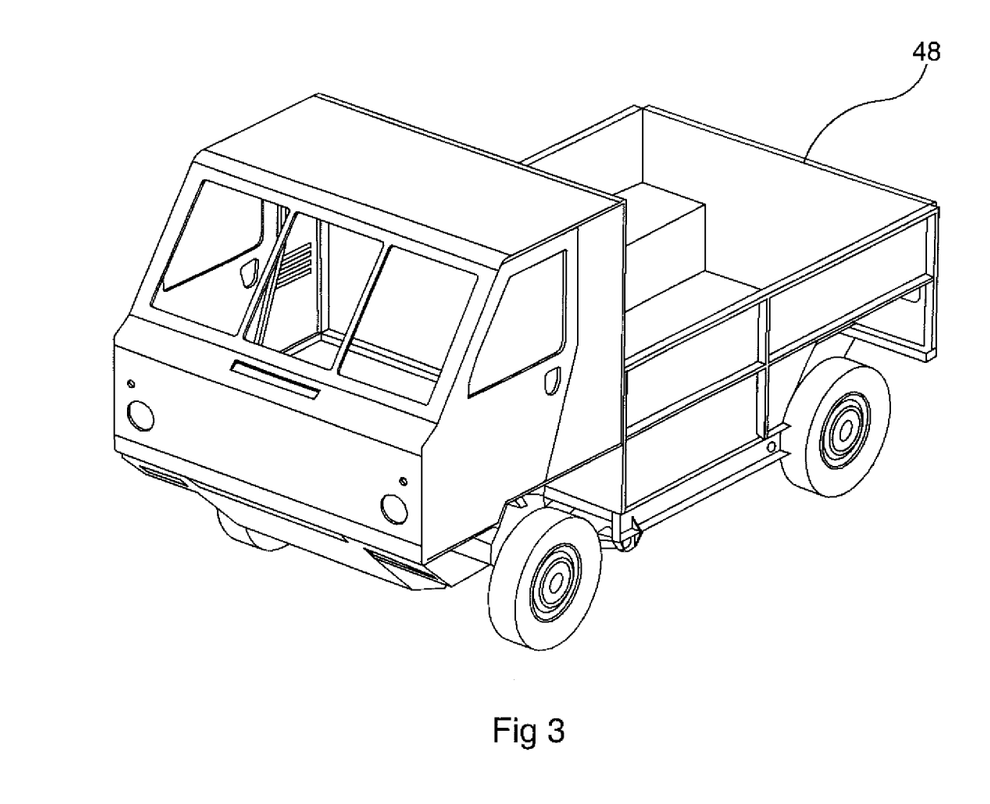
FIG. 3 shows the completed vehicle.

FIG. 2 shows the chassis 12 with the chassis uprights in place, but without the trim panels. A rigid spar 46 is also shown in FIG. 2, extending between the front side chassis uprights 20, 22 at the upper rear corner of the cabin, in order to provide the necessary rigidity to the cabin structure. The kit would not normally adopt the configuration shown in FIG. 2, as will be understood from the description below, but the figure illustrates the arrangement of the structural members of the vehicle. FIG. 3 shows the completed vehicle 48 after full assembly of the kit, for reference.

Figure 4:
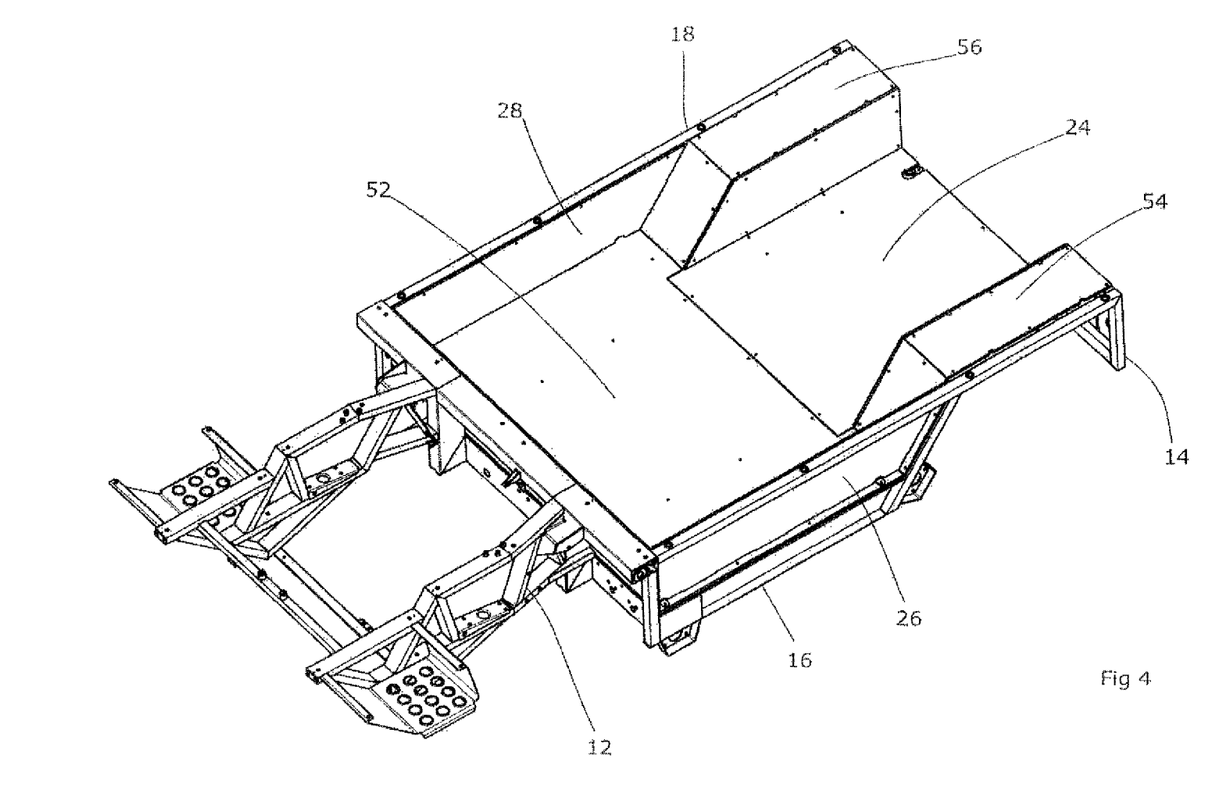
FIG. 4 shows the chassis and interior panelling ready for packing.

Thus, the structure and composition of the final vehicle is shown in FIGS. 1 to 3. FIGS. 4 to 9 then show the sequential stages in the preparation of the kit for shipping towards an end user. In FIG. 4, the chassis 12 has been provided with the rear and rear side chassis uprights 14, 16, 18 and with the interior panelling sections 24, 26, 28 for the load space. This results in the load space of the eventual vehicle being defined. This load space can then be used to contain other parts of the kit. It should be noted that the uprights and panels are to a slightly different design of vehicle with lower loadspace walls than that of FIGS. 1 to 3, thus that range of possible vehicles to which the invention can be applied includes many variations and is not limited to either of the specific designs illustrated.

FIG. 4 shows the loadspace 52 with intrusions 54, 56 towards the rear part of the loadspace, covering the rear suspension components. Thus, the loadspace 52 comprises a region towards the front of the vehicle which is laterally wider that a region towards the rear of the vehicle.

Figure 5:
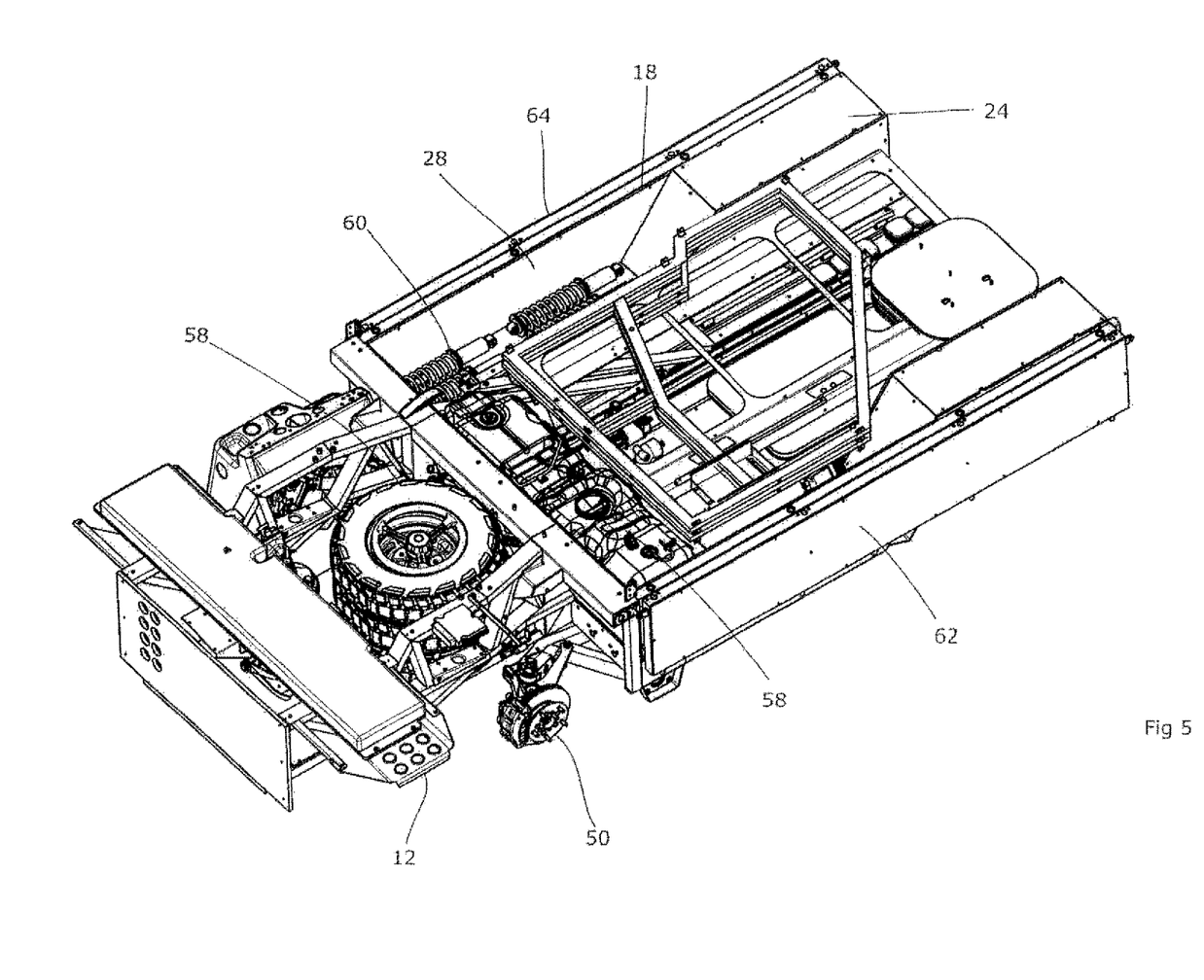
FIG. 5 shows a perspective view of the packed kit ready for shipping.
Figures 6, 7:
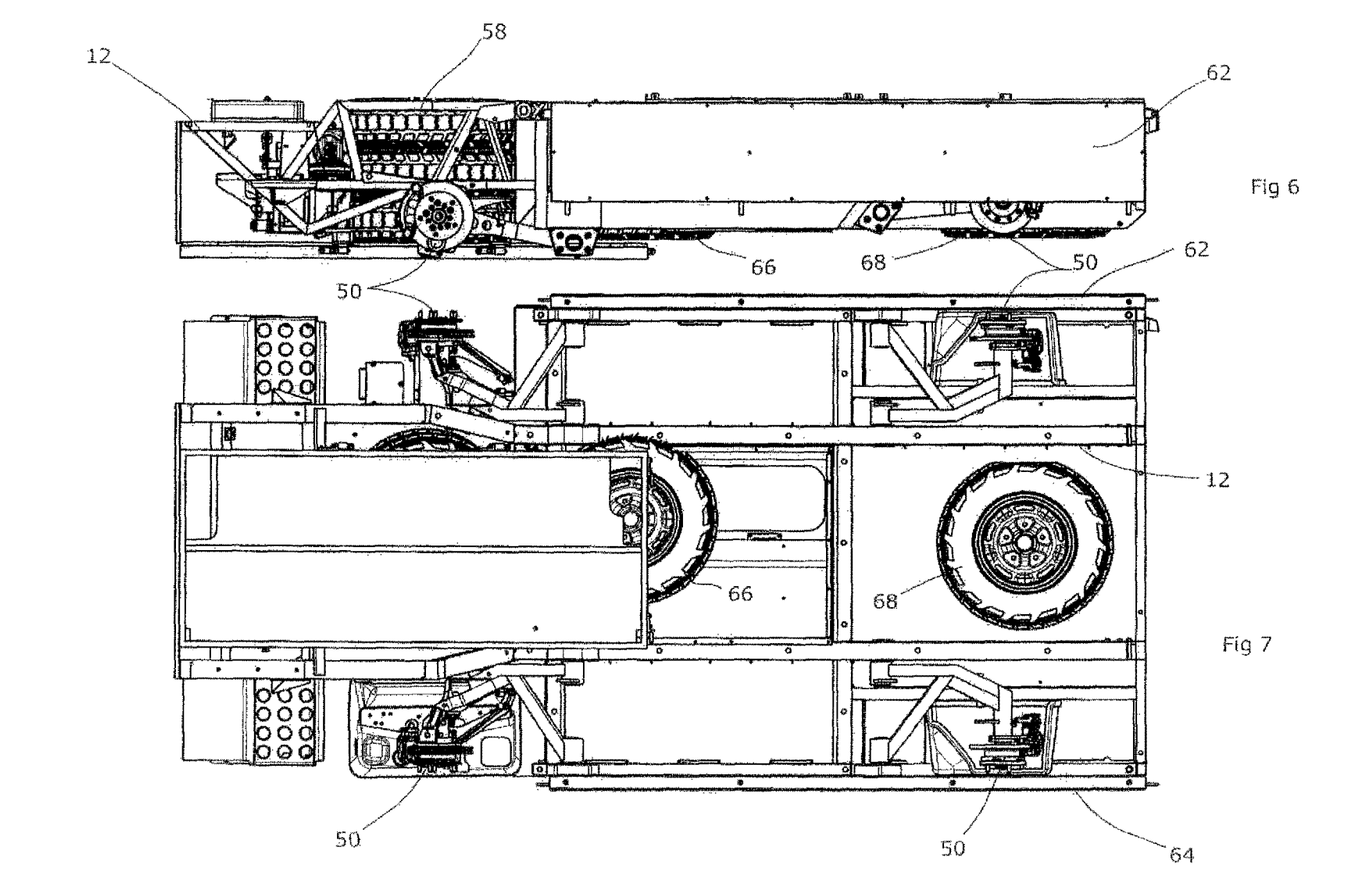
FIG. 6 shows a side view of the packed kit ready for shipping.
FIG. 7 shows a view from beneath of the packed kit ready for shipping.

To create the palletised kit ready for shipping shown in FIGS. 5 to 7, the wiring looms and major suspension parts (such as the suspension arms, wheel hubs and brake assemblies 50) are first fitted to the chassis. These neither take up a substantial part of the loadspace nor extend the volume of the chassis and panel assembly (of FIG. 4) significantly. Then, the remaining parts of the kit are loaded into the spare volume of the thus-created part-assembled kit. Two wheels 58 can be accommodated within the engine bay, and the flat panelling and upright items can be located in the loadspace, ideally with a layer of protective cushioning material between them such as air bubble packing (e.g. Bubble-Wrap®). The front side uprights 20, 22 are placed flat in the loadspace 52 with their taller rear sections located towards the front of the loadspace 52 and the shorter forward sections located towards the rear of the loadspace 52. Thus, the shorter parts of the front side uprights 20, 22 locate into the narrower part of the loadspace 52 and the taller parts into the wider sections.

Other parts for the kit can be located in the interstices thus created. A fuel tank 58 is positioned ahead of the front side uprights 20, 22. Spring/damper assemblies 60 to one side of the loadspace. Supplying the spring/damper assemblies 60 separate (i.e. unfitted) means that the suspension assemblies will collapse into a fully retracted state, allowing the kit to be more compact. Also shown in FIG. 5 are fold-down side walls 62, 64, comprising panels attached to the top of the rear side chassis uprights via hinges. These allow the total height of the kit as packaged to be reduced while retaining the useful high side of the design shown in FIGS. 1 to 3.

FIGS. 6 and 7 show two further wheels 66, 68 beneath the floor of the loadspace 52, between the longitudinal members of the chassis 12. Together with the two wheels 58 in the engine bay, these make up the necessary four wheels. The engine and gearbox are packed in one or more separate containers for shipping alongside the thus-packed kit.

Figure 8:
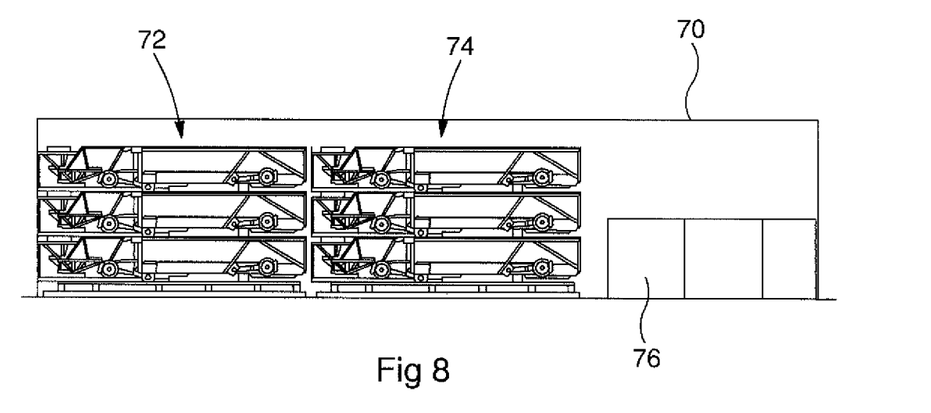
FIGS. 8 and 9 show side and perspective views (respectively) of a plurality of such kits arranged within the interior volume of a standard 40' shipping container.
Figure 9:
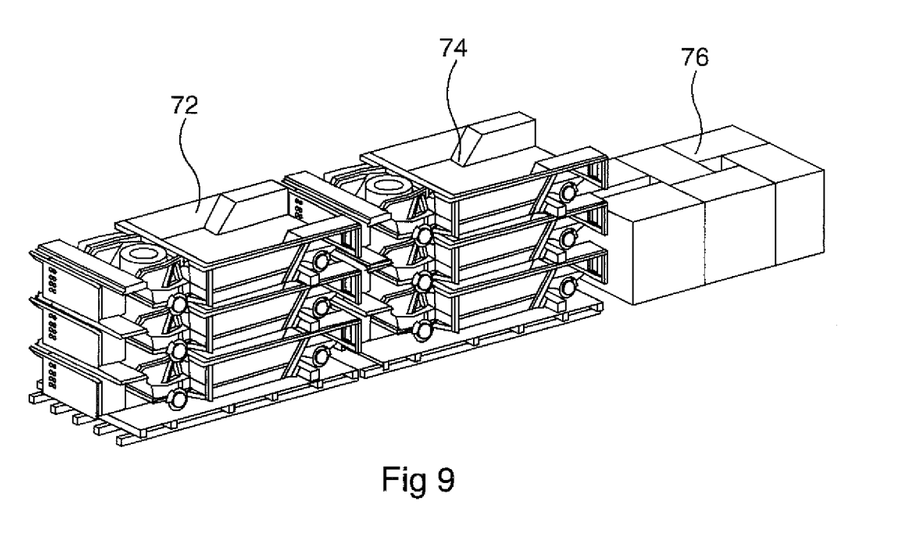

FIGS. 8 and 9 show six such kits packed into the space offered by a standard 40 foot shipping container 70. Within the space available, the kits can be stacked in two columns 72, 74, each three kits high. This leaves sufficient space for six boxes 76 each containing an engine and gearbox.

Once the kit is delivered, all that is needed is for the engine and gearbox to be lifted into place and secured, for the engine ancillaries to be fitted, the bodywork panels to be fitted, and the cabin interior and controls assembled. These are all straightforward steps and, to date, have presented even amateur builders of kits such as the Caterham 7 with little difficulty. Thus, the present invention allows the easy and efficient distribution of a kit that is straightforward to assemble into a commercial vehicle by a local distributor or an end user.

It will of course be understood that many variations may be made to the above-described embodiment without departing from the scope of the present invention.

Although the present disclosure has been described with reference to one or more examples, workers skilled in the art will recognize that changes may be made in form and detail without departing from the scope of the disclosure and/or the appended claims.

The invention claimed is:

1. A kit for building a commercial vehicle, comprising:
a chassis which includes a load space defined by a floor area and side walls that at least partially surround the floor area,
an engine attachable to the chassis, and
a plurality of upright chassis members attachable to the chassis thereby to define at least a cabin, placed flat over and supported by a part of the chassis, in which further components of the kit are placed within the load space.

2. The kit according to claim 1 in which the chassis, engine, and upright chassis members of the kit are restrained in place.

3. The kit according to claim 2 in which the chassis, engine, and upright chassis members are restrained by wrapping the kit with a web.

4. The kit according to claim 2 in which the chassis, engine, and upright chassis members are restrained by tying with one of a band or a cord.

5. The kit according to claim 1 in which the upright chassis members are capable of defining the cabin when arranged in a first orientation, and are placed flat over and supported by a part of the chassis in an orientation differing from the first orientation.

6. The kit according to claim 5 in which the kit includes further parts to extend the height of the side walls.

7. The kit according to claim 1 in which the load space is made up of a relatively wider portion ahead of a rear suspension attachment point provided on the chassis, and a relatively narrower portion to the rear thereof.

8. The kit according to claim 7 including at least one side panel of the cabin, having a first section of a relatively greater dimension and a second section of a relatively lesser dimension, accommodated substantially horizontally in the load space with the first section in the relatively wider portion and the second section projecting into the relatively narrower portion.

9. The kit according to claim 1 in which body panels attachable to the chassis uprights are provided, placed substantially horizontally over the chassis.

10. The kit according to claim 9 in which the body panels are separate from the upright chassis members.

11. The kit according to claim 9 in which the body panels are attached to the upright chassis members.

12. The kit according to claim 9 in which the body panels are integral with the upright chassis members.

13. The kit according to claim 1 in which the chassis includes at least one of brake lines, a wiring loom, an engine, transmission, differential, driveshaft, or propshaft attached thereto.

14. A shipping container containing a plurality of kits according to claim 1, arranged such that at least one kit lies above at least one other kit.

15. The shipping container according to claim 14 further comprising at least one spacer located between the vertically-separated kits.

16. A kit for constructing a commercial vehicle supplied ex-works as a flat-pack package using the vehicle chassis as a pallet.

* * * * *